March 3, 1964 R. E. WAUGH 3,123,508
METHOD OF BONDING FOAM TO FABRIC
Filed April 7, 1958
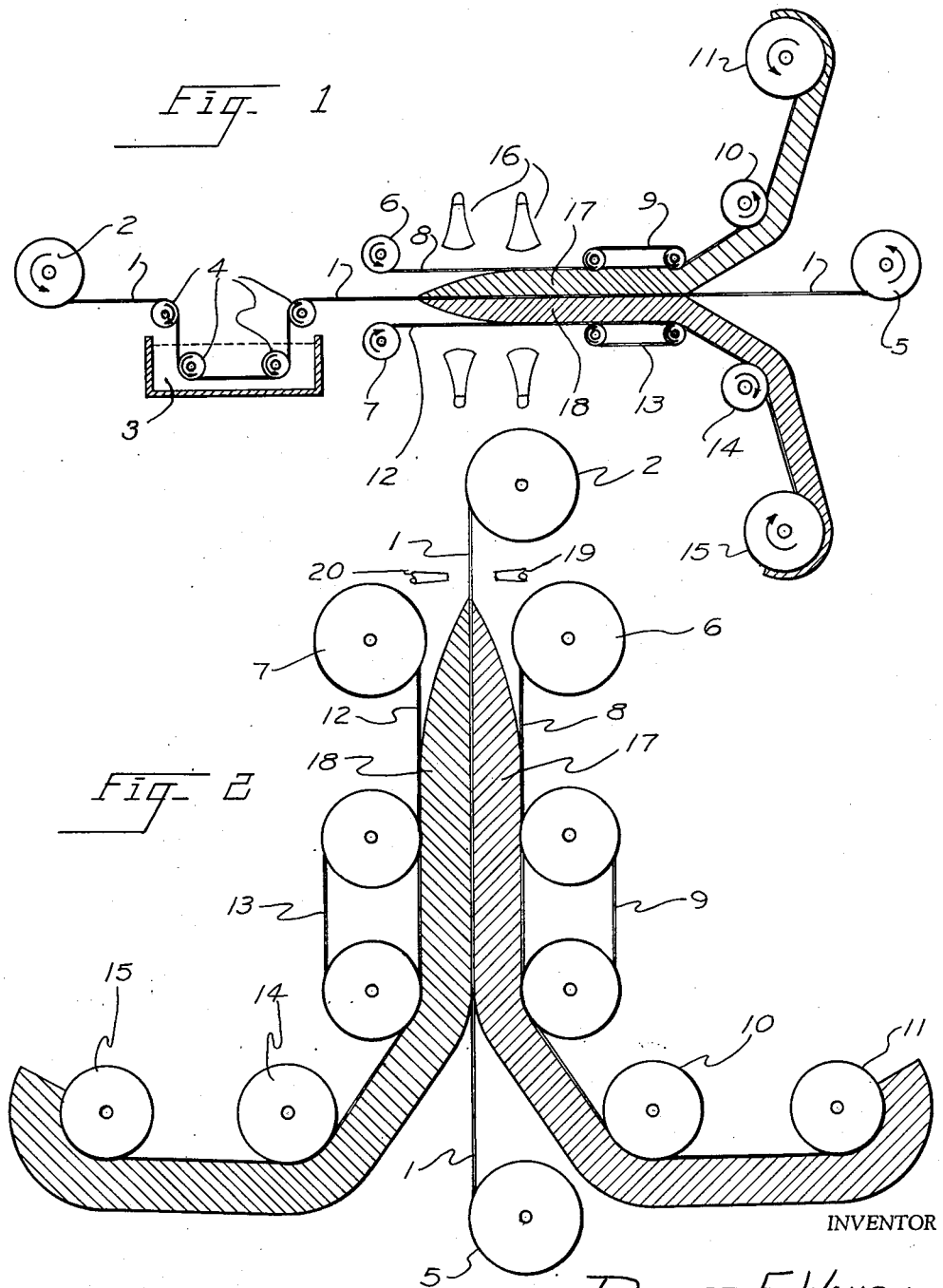
INVENTOR
ROBERT E. WAUGH
BY Diggins & LeBlanc
ATTORNEYS 3,123,508
METHOD OF BONDING FOAM TO FABRIC
Robert E. Waugh, Camp Hill, Pa., assignor to The Englander Company, Inc., Baltimore, Md., a corporation of Delaware
Filed Apr. 7, 1958, Ser. No. 726,670
8 Claims. (Cl. 156—78)

The present invention relates to composite articles of fabric and polyurethane foam and to a method of adhering foaming substances to fabrics. More specifically the invention relates to a method of bonding a foaming substance to a fabric which prevents the foam from soaking through the fabric during application.

Considerable difficulty has been experienced in the prior art in applying foams such as polyurethane foams, directly to thin fabrics, because of the foam soaking through the fabric and changing its appearance. This phenomena is generally referred to as "strike through."

It is an object of the present invention to apply polyurethane foams to fabrics, while preventing soaking of the foam material through the fabric.

It is another object of the present invention to form a polyurethane foam on a web of material to which the foam has a low degree of adhesion, to permit the outer or exposed surface of the foam to partially cure to a degree where its viscosity is high enough to prevent strike through, thereafter to adhere the exposed surface of the foam to a fabric by bringing the foam directly into contact with the fabric to be coated and subsequently cure the foam and pass the fabric along a path which diverges from that of the original web so as to strip the foam from the web of material to which it has a low degree of adhesion.

In accordance with one embodiment of the present invention, a web of material such as "Mylar," cellophane, polyethylene, "Teflon," nylon, etc., is passed through a bath of polyurethane foam prepolymer. Foaming can be accomplished at room temperatures or with moderate heating. In the first embodiment of the invention which will be hereafter described in detail, a heat sensitive foaming agent and catalyst may be employed. Polyurethane materials suitable for use in the present invention are described in the technical literature. The sheet is thereafter passed parallel to a moving web of fabric to which the foam is to be applied and they are subjected to heat which accelerates foaming of the prepolymer. As the prepolymer foams, a tough, viscous skin forms on the free surface and this skin is quite tacky before the foam is cured.

The spacing between the polyethylene web and the web of the fabric is such that when the prepolymer foams, the foam fills the space between the two webs. The rate of application of heat taken in conjunction with the velocity of the web is such that the surface skin is developed to such a degree that the foam adheres to the web of fabric, but does not strike or bleed through, so as to spoil the surface appearance of the fabric. Thereafter, the two webs and the foam are passed through a heat zone where the foamed prepolymer is cured, and then the web of polyethylene and the foam covered web of fabric are conducted along divergent paths, the foam adhering to the fabric and being stripped from the polyethylene web. The web of polyethylene is wound on a roller and may be reused while the foam backed fabric is similarly wound and collected.

The method outlined above is particularly useful and economical in that two webs of foam backed fabric may be formed simultaneously. When the web of polyethylene is passed through the prepolymer bath of polyurethane, a thin film of the bath material remains deposited on both surfaces of the sheet. Thereafter, if the sheet is passed between two fabric webs, one disposed on each side thereof, and subjected to heat, two foam backed webs of fabric are formed simultaneously, each web being conveyed along the path which diverges from the path of the web of polyethylene so as to strip both foam backed fabrics from the latter web.

In a second embodiment of the present invention, polyurethane prepolymer is sprayed onto a moving web of polyethylene. The polyurethane foams and the foam thereafter swells into contact with a moving web of fabric to be backed so as to produce adhesion between the fabric and the foam. The foam is then cured and thereafter the foam backed web and the polyethylene web diverge to strip the foam from the latter web. In this embodiment, the polyurethane may be sprayed on opposed surfaces of the polyethylene web and the web thereafter passed between two fabric webs so as to produce two foam backed fabrics simultaneously.

In their broadest aspects, the two embodiments of the method of the present invention are not restricted to polyurethane foams, the embodiments of the method being also applicable to latex, vinyl and similar foaming materials, particularly with respect to the simultaneous formation of two foam backed webs. The method of the present invention is, however, particularly applicable to polyurethane and similar foams since these foams have surface tension characteristics which often strike through fabrics, and the polyurethane foams have properties which make them particularly useful in this method.

The foams produced in accordance with the present invention may be employed for the fabrication of a number of composite fabric products. The foams may be applied to upholstery and drapery material, automobile upholstery material, mattress ticking, pillowcase ticking, bedspreads and other related materials. In the garment and wearing apparel field, a thin layer of foam applied to an attractive cloth such as poplin will create a windproof, rainproof and insulated fabric. Its warmth will exceed that of wool on either a weight basis or a thickness basis, and this is also true of footwear and headwear, as well as hand and body garments. The method is particularly applicable to the manufacture of carpeting and rugs, and padded carpet may be manufactured in a continuous operation. With the foam applied directly to the carpeting of rugs, a cushion is not required under the rug. The foam itself provides the cushioning in addition to increasing the wear life of the product many times. It has also been found that foams applied in accordance with the present invention reduce the tendency of fabrics to wrinkle, eliminate stress lines in the fabrics, and the fabrics lay or drape smoother, straighter and flatter than uncoated fabrics.

It is therefore another object of the present invention to provide a method of bonding a foam to a fabric wherein an uncured foam of a compound is formed upon a surface for which the foam has a low degree of adhesion, a length of material for which the foam compound has a high degree of adhesion is brought into contact with a surface of the foam while the foam is still tacky, the foam is cured and the latter material and foam are stripped as a unit from the surface.

It is another object of the present invention to provide a method for simultaneously bonding foams of a compound to two lengths of material wherein an uncured foam of a compound is formed upon opposed surfaces of a first web for which the foam has a low degree of adhesion, distinct lengths of material, for which the foam has a high degree of adhesion, are each brought into contact with a different one of the foams formed on opposed surfaces of the web, the foams are cured and thereafter the fabric webs and the first web are conducted along divergent paths.

Yet another object of the present invention is to provide a method for bonding foaming materials to two fabric webs simultaneously, wherein a first web for which the foams have a low degree of adhesion is passed through a bath of a foam prepolymer of the foaming material containing a heat sensitive foaming agent and catalyst, the coated first web is passed between and parallel to two fabric webs, the webs are subjected to heat to effect foaming of the prepolymer, the foam is cured and the fabric webs and the first web are conducted along divergent paths.

Still another object of the present invention is to provide a method for bonding foamed materials to two fabric webs simultaneously wherein as foam is sprayed onto opposed surfaces of a first web, the first web thereafter passes between and parallel to two fabric webs, the foam is cured and then the fabric webs are conducted along paths which diverge from the path of the first web.

Still another object of the invention is to provide novel composite articles of foam and fabric.

The above and still further objects, features and advantages of the present invention will become apparent upon consideration of the following detailed description of the apparatus employed for carrying out two embodiments thereof, especially when taken in conjunction with the accompanying drawings, wherein:

FIGURE 1 is a diagrammatic illustration of the apparatus employed for carrying out the method of the first embodiment of the present invention; and FIGURE 2 is a diagrammatic illustration of the apparatus employed for carrying out the method of the second embodiment of the present invention.

Referring specifically to FIGURE 1 of the accompanying drawings, a thin smooth web 1 of polyethylene, Mylar, cellophane, Teflon or other suitable material to which the foam to be formed has a low degree of adhesion is fed from a feed roller 2 and through a bath 3 of polyurethane foam prepolymer which may contain a heat responsive foaming agent. The web 1 is directed through the bath 3 by means of a plurality of appropriately located rollers 4 and thereafter passes to a take-up reel 5, displaced some distance from the bath 3.

Located on either side of the web 1 and closely adjacent to the bath 3 are two supply reels 6 and 7 from which the fabrics to which the foam is to be applied are supplied. An upper web 8 of fabric or other material to be coated extends parallel to the web 1 and passes under a heated conveyor belt 9 and thereafter passes over a guide roller 10 to a take-up reel 11.

The rollers 10 and 11 are arranged such that the web 8 of fabric follows a path which diverges from that of the polyethylene web 1, and as specifically illustrated in FIGURE 1, the web 1 follows a horizontal path and the web 8 of fabric 6 moves upwardly and to the right. A second web 12 of fabric or other material is located below and parallel to the polyethylene web 1 and is supplied from the reel 7. The web 12 follows a path parallel to the web 1 and passes over a heated conveyor belt 13. Thereafter, the web 12 passes over a guide roller 14 to a take-up reel 15, the roller 14 and the reel 15 being disposed along a path which diverges downwardly and to the right, as viewed in FIGURE 1, from the moving web 1.

Located between the rollers 6 and 7 on the one hand and the heated conveyer belts 9 and 13 on the other are a plurality of heat lamps 16 which supply adequate heat to produce initial foaming of the polyurethane foam prepolymer. The polyethylene web 1, in passing through the bath 3, picks up on its upper and lower surfaces a predetermined amount of the liquid polyurethane foam prepolymer. As the web 1 passes between the heat lamps 16, the heat responsive foaming agent causes the liquid foam prepolymer of polyurethane on the upper and lower surfaces of the web 1 to foam, the foaming causing the substances to swell. The webs 8 and 12 of material to which the foam is to be bonded are displaced from the web 1 by a distance equal to or less than the change in dimension of the prepolymer upon foaming, and the foams which are indicated by the reference numerals 17 and 18 expand into contact with the fabrics 8 and 12 respectively.

The rate at which heat is supplied by the lamps 16, when taken in conjunction with the velocity of the web 1, is such that the foams develop a skin on the free surface to such degree that although the skins are sufficiently tacky to adhere to the webs 8 and 12, they are sufficiently viscous not to strike through or soak the fabrics and appear on the upper and lower surfaces of the webs 8 and 12 respectively. Thereafter, the webs 1, 8, 12 and the polyurethane foams 17 and 18 pass between the heated conveyer belts 9 and 13, the conveyer belts being at a sufficient temperature to cure the polyurethane foams after which they adhere strongly to the fabric.

Since, as previously pointed out, the polyurethane foam has a low degree of adhesion to the polyethylene web 1 but has a high degree of adhesion to conventional fabrics from which the webs 8 and 12 are fabricated, upon divergence of the foams 17 and 18 and the web 1, the foams are stripped from the web 1 and adhere to the fabric webs 8 and 12. The webs 8 and 12 are wound on the reels 11 and 15 and may be removed therefrom for further processing while the polyethylene web which is wound on the take-up roll 5 may be reemployed in the process numerous times.

It is apparent that the formation of foams on both surfaces of the web 1 permits fabrication of foam covered webs at twice the normal rate of production, and due to the method of fabrication, that is, the formation of a surface skin on the foams prior to contacting the fabric webs, strike through of the foam is prevented. As previously indicated, the present method is particularly applicable to polyurethane wherein problems with strike through of materials have previously been encountered. However, it is not intended to limit the process of the present invention to polyurethane since the process is applicable to any of the foam forming resins or natural products such as natural latex.

A second embodiment of the method of the present invention is illustrated in FIGURE 2 of the accompanying drawings. Elements common to both figures are designated by the same reference numerals. A web 1 of polyethylene is fed from a feed roll 2 directly to a take-up roll 5. Webs 8 and 12 of fabrics to be coated are fed respectively from feed rolls 6 and 7 and between heated conveyer belts 9 and 13 to take-up rolls 11 and 15. In this embodiment of the invention, the polyurethane prepolymer is applied directly to both sides of the web 1 in the form of a spray, one layer being supplied from a bank of nozzles 19 and the other layer being supplied from a bank of nozzles 20. The uncured foams 17 and 18 form and build up on the web 1 in an uncured state as it travels downwardly and skins form on the outer surface of the foams. As viewed in FIGURE 2, the foams 17 and 18 build up until they contact the webs 8 and 12 respectively on the right and left sides of the web 1, as viewed in FIGURE 1. The initial velocity of the foaming of the prepolymer supplied from the nozzles 19 and 20 is such when taken in conjunction with the velocity of the web 1 that the outer surfaces of the foams air exposed prior to contact with the webs 8 and 12 to a tacky condition so that they adhere to the fabric webs but do not strike through. Thereafter, the foam is cured by the heat applied from the heated conveyer belts 9 and 13, webs 8 and 12 thereafter being directed along paths which diverge from the path of the web 1 to produce stripping of the foam from the web. In this embodiment of the invention, a heat sensitive foaming agent or chemical catalyst may be required, since the foam is sprayed directly on the web 1.

The present invention may also be used to provide a laminated material having fabric adhered on both sides of a foam layer. For example, a double layer of fabric could be substituted for the sheet 1 in either embodiment and the resulting material would consist of a layer of foam with fabric bonded to each side. Thus, a material could be provided for a garment having a rainproof material on one surface, a lining material on the other surface and a layer of foam between to provide heat insulation.

In the various embodiments of the present invention there is a minimum amount of wastage of the foam since the only trimming required would be at the edges of the fabric, a uniform thickness of foam being insured by the passage of the material between the heated conveyer belts 9 and 13.

One foam composition useful in the present invention composed of two parts Wyandotte Pluronic L-61, which is a polyoxyalkylene derivative of propylene glycol having an average molecular weight of 2000, and one part Wyandotte Tetronic 701, which is a polyoxyalkylene derivative of ethylene diamine having an average molecular weight of 2501–3000, and to each 100 gms. of that mixture is added 31.84 grams of toluene diisocyanate (80/20) and 0.5 gm. of silicone DC-200 (50 cst.). A suitable catalyst for the prepolymer is 1.1 parts of water, 1.0 part of N-methylmorpholine and 0.2 part triethylamine for each 100 parts of prepolymer.

Ordinarily, the catalyst is added to the prepolymer immediately prior to or during the foaming reaction. By varying the catalyst, the foaming reaction can be expedited or delayed and a catalyst can be used which is stable at room temperatures but which is activated by elevated temperatures.

When polyurethane foams are employed, the composite product itself is different from products heretofore known because the skin which forms on the polyurethane during foaming not only serves as an adhesive but also forms an impervious layer next to the fabric. Thus, in the case of carpet, the surface contiguous with the back of the carpet would be a substantially continuous skin. This prevents dirt from working through the carpet and thus simplifies cleaning and increases life. Because the foaming is the result of a reaction and the reactants can be thoroughly mixed, the foam body is uniform throughout and porosity, flexibility and density may be controlled. This uniformity is difficult to obtain and control with foams which are formed by the agitation of latices such as rubber, neoprene and the like and for rapid production, the mechanically formed foams require large and costly equipment. Further, many of these mechanically formed foams are applied in a fluid state so that they often strike through the fabric.

While I have described and illustrated two specific embodiments of my invention, it will clear that variations of the details of embodiments which are specifically illustrated and described may be resorted to without departing from the true spirit and scope of the invention as defined in the appended claims.

I claim:

1. A method of bonding a foam to a fabric, comprising, forming a substantially unrestricted freely rising uncured foam of polyurethane on a moving web for which such foam has low adhesion, heating, foaming and partially curing the polyurethane foam to develop a surface skin thereon, thereafter bringing a moving length of fabric for which the foam has high adhesion into direct surface contact with the foam, curing the foam and directing the web and the length of foam coated fabric along divergent paths to strip the foam coated fabric from the web.

2. A method of bonding a polyurethane foam to a fabric, comprising forming a substantially unrestricted freely rising uncured foam of polyurethane on a moving web of polyethylene, heating, foaming and partially curing the polyurethane foam to develop a surface skin thereon, thereafter bringing a moving length of fabric for which the partially cured foam has a high degree of adhesion into direct surface contact with the foam, the web of polyethylene and the length of fabric moving in approximately the same direction at approximately the same speed, curing the polyurethane foam and conducting the polyurethane coated fabric and the web of polyethylene along divergent paths to strip the foam from the polyethylene.

3. The method in accordance with claim 2 wherein the foam is formed on the polyethylene web by initially passing the web through a bath containing a polyurethane foam prepolymer having a heat sensitive foaming agent and catalyst and thereafter subjecting the web to heat to produce foaming of the polyurethane.

4. The method in accordance with claim 2 wherein the foam is sprayed onto the moving web of polyethylene.

5. A method of bonding a polyurethane foam to two lengths of material simultaneously, which method comprises the steps of forming a substantially unrestricted freely rising uncured polyurethane foam on each of the surfaces of a moving web of material for which the foam has a low degree of adhesion, bringing a distinct moving length of fabric for which the foam has a high degree of adhesion into direct surface contact with the foam on each surface of the web, curing the foam and directing the web along a path which diverges from the path of both of the polyurethane coated lengths of fabric to strip the polyurethane coated fabric from both surfaces of the web.

6. A method of bonding a polyurethane foam to two lengths of material simultaneously, which method comprises the steps of forming a substantially unrestricted freely rising uncured polyurethane foam on each of the surfaces of a moving web of polyethylene, bringing a distinct moving length of fabric for which the foam has a high degree of adhesion into direct surface contact with the foam on each surface of the web, curing the foam and directing the web along a path which diverges from the path of both of the lengths of fabric to strip the polyurethane coated fabric from both surfaces of the web.

7. The method in accordance with claim 6 wherein the foam is formed on the polyethylene web by initially passing the web through a bath containing a polyurethane foam prepolymer having a heat sensitive foaming agent and catalyst and thereafter subjecting the web to heat to produce foaming of the polyurethane.

8. The method in accordance with claim 6 wherein the foam is sprayed into the moving web of polyethylene.

References Cited in the file of this patent

UNITED STATES PATENTS

| 2,628,654 | Alderfer | Feb. 17, 1953 |
| 2,841,205 | Bird | July 1, 1958 |
| 2,866,730 | Potchen et al. | Dec. 30, 1958 |
| 2,879,197 | Muskat et al. | Mar. 24, 1959 |
| 2,956,310 | Roop et al. | Oct. 18, 1960 |
| 2,962,406 | Rosa | Nov. 29, 1960 |

FOREIGN PATENTS

| 278,192 | Great Britain | Oct. 6, 1927 |